US007853693B2

(12) United States Patent  
Abraham et al.

(10) Patent No.: US 7,853,693 B2
(45) Date of Patent: Dec. 14, 2010

(54) LOCATION BASED NETWORKED DEVICE UTILIZATION

(75) Inventors: Subil M. Abraham, Plano, TX (US); Tam M. Cao, Trophy Club, TX (US); Adam A. Nemati, Carrollton, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 11/344,268

(22) Filed: Jan. 31, 2006

(65) Prior Publication Data

US 2007/0180082 A1 Aug. 2, 2007

(51) Int. Cl.
*G06F 15/173* (2006.01)
(52) U.S. Cl. .................. 709/226; 358/425; 345/639
(58) Field of Classification Search ............ 709/226; 358/425; 345/639
See application file for complete search history.

(56) References Cited

U.S. PATENT DOCUMENTS

| 5,153,577 | A | * | 10/1992 | Mackey et al. ............... 345/639 |
| 6,690,478 | B1 | * | 2/2004 | McIntyre ................... 358/1.13 |
| 6,711,617 | B1 | | 3/2004 | Bantz |
| 6,747,562 | B2 | | 6/2004 | Giraldin |
| 6,754,699 | B2 | | 6/2004 | Swildens |
| 6,848,542 | B2 | | 2/2005 | Gailey |
| 2005/0174609 | A1 | * | 8/2005 | Thurlow ..................... 358/425 |

* cited by examiner

*Primary Examiner*—Tammy T Nguyen
(74) *Attorney, Agent, or Firm*—Patents on Demand, PA; Brian K. Buchheit; Scott M. Garrett

(57) ABSTRACT

A method for utilizing networked devices can include a step of receiving a network job associated with a network user. A location of the network user can be automatically determined. One of many possible networked devices can be dynamically selected based upon the determined user location. The network job can be assigned to the selected device.

18 Claims, 4 Drawing Sheets

LOCATION BASED NETWORKED DEVICE UTILIZATION

BACKGROUND

1. Field of the Invention

The present invention relates to the field of networking, and, more particularly, to dynamically assigning devices to network jobs based upon intended recipient locations.

2. Description of the Related Art

Many problems exist with conventionally networked devices that can be frustrating to users and can consume excessive quantities of information technology resources. A user must typically specify a printer to which a document is to be outputted. This printer is often designated by a network name. A network name is a device identifier that uniquely identifies the printer within the network, which may seem cryptic to a user. A user who wants to send results to a known printer having an unknown network name will often physically walk to the printer, read the network name, walk back to their workstation, then select the desired network name from a list of available printers. The user will then have to walk back over to the printer to retrieve paper output.

Some users not wishing to travel to the printer to determine a network name may select a network name without being entirely sure that the selected printer is a desired one. When the user gets up to retrieve a print job and notices the selected network name was different from a desired printer, the user will typically take one of two actions. The user may search for the previously selected printer and retrieve the document already generated by that printer. The user may also note the desired printer's network name, return to their workstation, select the desired printer, and resend the print job. The already printed document will subsequently be forgotten, which can consume resources unnecessarily, can pose a security risk of others reading the forgotten print job, and can have other harmful effects.

Another problem with conventionally networked devices relates to workload distribution. Users typically print to a default printer, regardless of a current load placed upon that printer. As a result, a user often has to wait an excessive time for a job to print, even though other unused printers are available for handling the print job. Printers that have been established as the default printer for high output users tend to break and run out of supplies much more rapidly than other printers.

Additionally, many offices have established capability differentiated printers, where specific printers are intended to be exclusively utilized for specialized network jobs. For example, a color laser printer having an expensive cost per page can be intended to be utilized only for published documents, marketing material, or proofs. One or more high speed printers can be reserved for excessively large print jobs. Other printers can be designated for poster size prints, for confidential documents, and for other uses. Unfortunately, mistakes in sending print jobs to wrong printers are common. These mistakes can be due to user confusion regarding a proper method to select printers, user habits of sending all jobs to a default printer, and the like.

What is needed is a new, more intuitive technique for conveying output to networked devices. Optimally, output should be automatically provided to devices located near intended output recipients, without requiring an explicit user selection of a networked device. This feature would be particularly important for mobile users that often work from different locations. Ideally, additional factors such as device load, device specialization, job attributes, and the like should be considered when assigning jobs to networked devices.

SUMMARY OF THE INVENTION

The present invention provides a solution for automatically selecting a networked device based upon user location in accordance with an embodiment of the inventive arrangements disclosed herein. More specifically, network users can carry a location determination device, generically referred to herein as a location beacon. Device servers, such as print servers, can automatically select one of many possible devices based in part upon a device's proximity to the intended output recipient. Once a job is sent to a device, the user can be notified, such as through an email message or pop-up window, that a print job is available at a particular location for pick-up. As a mobile user travels from location to location, different networked devices convenient to the user's current position can be automatically utilized for jobs directed to the user.

In one embodiment, the various device services described herein can include device drivers for the devices that the server manages. For example, a print server can include the various print drivers for the different printers which it manages. Accordingly, it is unnecessary to place device drivers for each networked device upon computers which utilize the devices. Thus, the present invention can alleviate problems associated with conventional device installations.

The present invention can be implemented in accordance with numerous aspects consistent with material presented herein. For example, one aspect of the present invention can include a method for utilizing networked devices. The method can include a step of receiving a network job associated with a network user. A location of the network user can be automatically determined. One of many possible networked devices can be dynamically selected based upon the determined user location. The network job can be assigned to the selected device.

Another aspect of the present invention can include a method for automatically selecting among networked printers based upon user location. In the method, a print server can receive a print job. The print server can determine an intended recipient for the print job. A location server can dynamically determine a current physical location of the intended recipient. A networked printer closest to the physical location of the recipient can be automatically determined. The print job can be automatically assigned to that printer.

Still another aspect of the present invention can include a system that generates output based upon an automatically determined user location. The system can include one or more client machines configured to provide network access to network users. One or more networked devices can be configured to receive and handle jobs. A location server can determine physical locations of network users. A device server can receive jobs and can identity at least one network user for whom each of the jobs is intended. The device server can then assign the jobs to networked devices based upon at least one determined factor. One of the determined factors can be proximity of a networked device to a location of the network user for whom a job is intended. The location of the network user can be automatically determined by the location server.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
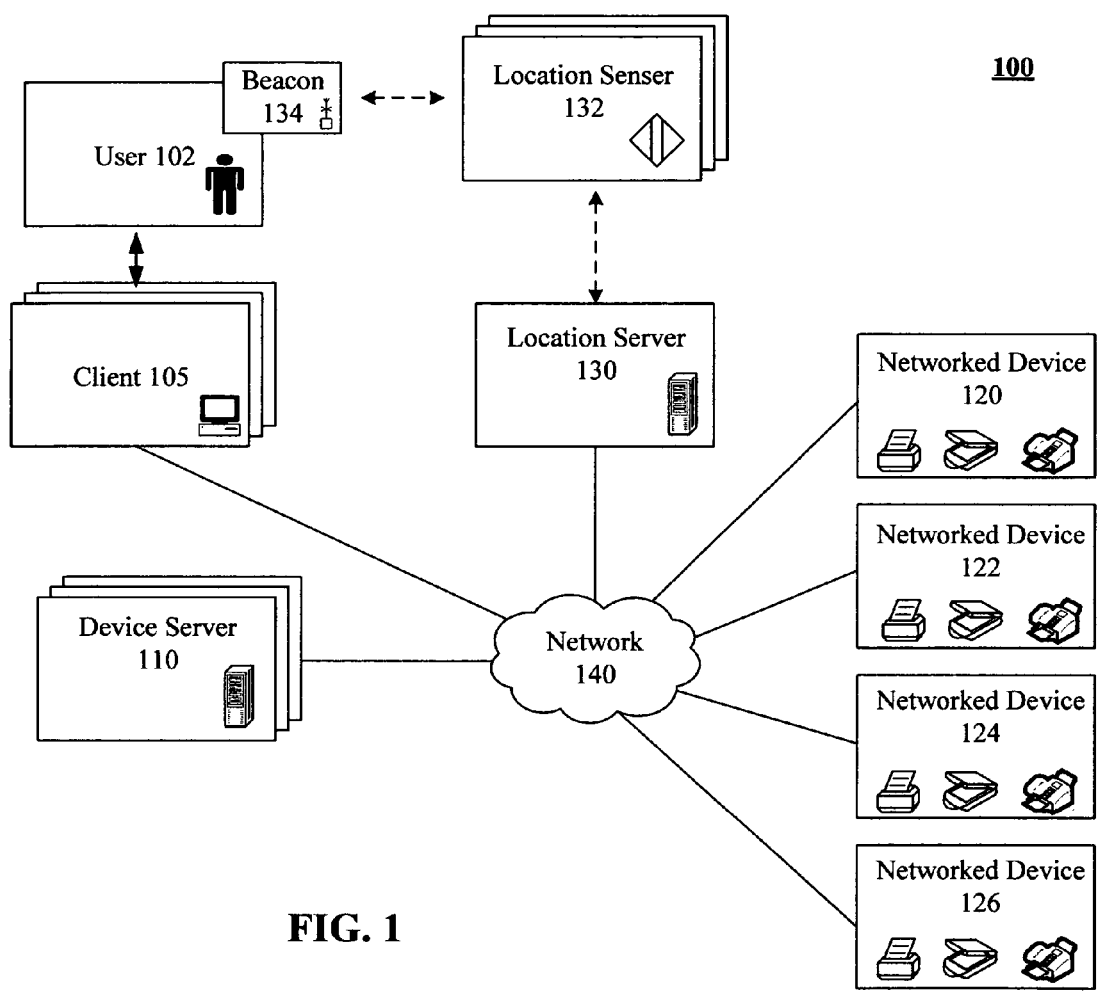
FIG. 1 is a schematic diagram of a system for assigning network jobs to networked devices based at least in part upon an intended recipient's proximity to the networked devices in accordance with an embodiment of the inventive arrangements disclosed herein.

FIG. 1 is a schematic diagram of a system 100 for assigning network jobs to networked devices based at least in part upon an intended recipient's proximity to the networked devices in accordance with an embodiment of the inventive arrangements disclosed herein. System 100 can include at least one device server 110, a location server 130, and networked devices 120, 122, 124, and 126 communicatively linked via network 140.

Each networked device 120, 122, 124, and 126 can include a peripheral capable of generating output or receiving input. Each of the networked devices 120, 122, 124, and 126 can be a stand-alone device directly connected to network 140. Each device 120, 122, 124, and 126 can also include a device linked to and controlled by a computer or device server.

A common networked device 120, 122, 124, and/or 126 is a printer that generates printed output. Other types of devices 120, 122, 124, and 126 are contemplated including, but not limited to, fax machines, copiers, visual displays, audio transceivers, data storage mediums, and the like, each of which generates output in one form or another. Additionally, each of the devices 120, 122, 124, and/or 126 can be devices configured for accepting user provided input, such as speech input (where device 120, 122, 124, and/or 126 can include a microphone), visual input (a camera), and document input (a scanner).

The network 140 can include a plurality of different peripherals 120, 122, 124, and/or 126 of the same type. Each peripheral 120, 122, 124, and 126 can have peripheral specific characteristics, such as location, load, input/output quality, document classification (confidential or non-confidential), and input/output speed.

Device server 110 can receive network jobs and can responsively assign the jobs to one or more of the networked devices 120, 122, 124, and 126. For example, one device server 110 can be a print server that assigns print jobs to networked printers. Device server 110 can also include a fax server that routes incoming and/or outgoing fax messages to assigned devices. Another device server 110 can include a media server that presents audio and/or video signals to networked audio/video presentation devices.

Unlike many conventional device servers, device server 110 does not require a user 102 submitting a network job to designate an output device. For example, a user 102 submitting a print job does not need to specify a printer that is to handle the job. Instead, device server 110 automatically determines a suitable device for handling a job based upon one or more factors, an important one of which is an intended recipient's proximity to a device. For example, the device server 110 can dynamically and automatically assign the device 120, 122, 124, or 126 that is closest to a location of a user 102 for whom output is intended or from whom input is desired.

Moreover, the device server 110 can be configured to redirect network jobs that target a specific device to a different device, which is closer to an intended user 102. For example, a fax machine associated, with a phone number can receive a fax message from a remote source. The device server 110 can redirect the received fax message from the data receiving fax machine to a different device near the intended recipient. The device outputting the received fax message need not be a fax machine, but can be any output device, such as a printer.

In one embodiment, the device server 110 can include device drivers for the devices 120-126 that it manages. This alleviates problems resulting from users having to handle device 120-126 installation issues. It also permits drivers to be located in a centralized location, which minimizes problems with deploying devices 120-126 and with updating drivers, which typically requires client 105 by client 105 handling.

The location server 130 can determine a location of a user 102, a client machine 105, and/or a networked device 120, 122, 124, and 126. This location information can be utilized by the device server 110. The location server 130 can determine a location in any of a variety of manners. For example, the location server 130 can include an asset database that indicates a physical location for different networked devices 120, 122, 124, 126, and client machines 105.

In one embodiment, the location information for various devices 120, 122, 124, and 126 can be manually entered into the location server 130. In another embodiment, the location information can be dynamically and automatically determined. For example, location determination beacons can be included with the networked devices 120, 122, 124, and 126. These location beacons can either broadcast location information or can be passive tags detectable by one or more location sensors 132. When a device 120, 122, 124, and/or 126 including a location beacon is moved from one location to another, the location server 130 can automatically update device location records.

User 102 locations can be determined in a number of manners by the location server 130. For example, a user 102 location can be inferred from a client machine 105 location upon which the user 102 is logged. User 102 location can also be automatically and dynamically determined based upon a user detection device. In one embodiment, each user 102 can carry a location beacon 134, from which the location server 130 can determine a location of the user 102.

For example, the location beacon 124 can be a Radio Frequency Identification (RFID) tag that can be included within any device commonly carried by users 102, such as a user's name tag, a parking pass, a keychain, a wallet card, a driver's license, and the like. RFID scanners (location sensor 132) can be strategically positioned so that locations of users 102 carrying RFID tags can be automatically determined. Information embedded within the RFID tags can be used to determine a user's identity, to obtain user preferences, and the like.

It should be appreciated that RFID tags and RFID scanners are only one of a variety of possible implementations for automatically determining a user's location and that the invention is not to be construed as limited in this regard. For example, a short distance transceiver, such as a BLUETOOTH transceiver, can be used as a location beacon 134. That is, devices within receiving range of a BLUETOOTH enabled device can be considered location sensors 132.

In another embodiment, a user 102 can carry an active location beacon 134 that independently broadcasts location information, such as a mobile phone that includes a GPS component that intermittently broadcasts the phone's location. The broadcasted location information can be received from a passive receiver operating as the location sensor 132.

Figure 2:
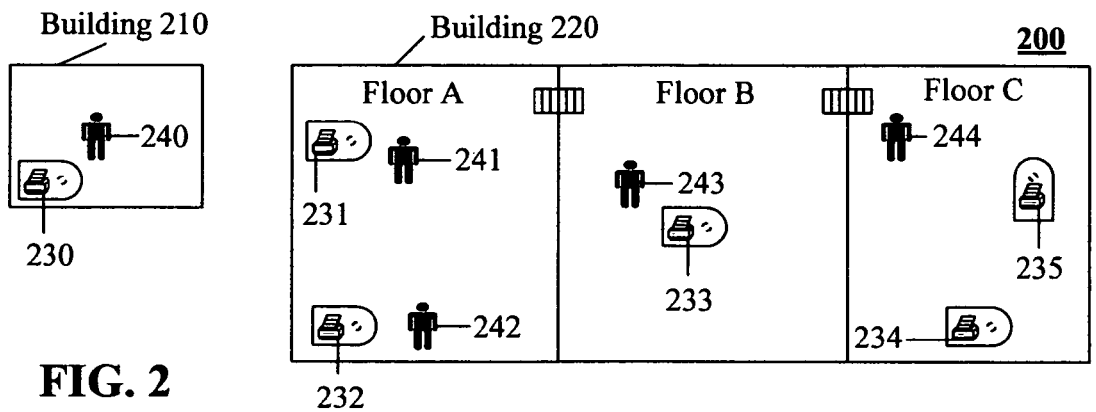
FIG. 2 is a schematic diagram of a system in which user locations are a factor when automatically assigning networked devices to network jobs in accordance with an embodiment of the inventive arrangements disclosed herein.

FIG. 2 is a schematic diagram of a system 200 in which user locations are a factor when automatically assigning networked devices to network jobs in accordance with an embodiment of the inventive arrangements disclosed. System 200 includes a building 210 and a building 220. Building 220 can include three floors; floors A, B, and C. Network printer 230 can be located in building 210. Network printer 231 and 232 can be located on floor A of building 220. Network printer 233 can be located on floor B. Network printers 234 and 235 can be located on floor C.

Multiple network users can be located within building 210 and building 220. User 240 can be located in building 210. Users 241 and 242 can be located on floor A. User 243 can be located on floor B. User 244 can be located on floor C.

The inventive arrangements described in system 100 can be used to determine locations for users 240-244 and printers 230-235 and to assign print jobs to printers 230-235 closest to intended users 240-244. For example, a print server (not shown) can receive a print job intended for user 240. A location server (not shown) can dynamically determine that printer 230 is the closest printer to user 240. The print job can responsively be assigned to printer 230.

In system 200, printer 231 can be automatically assigned to a print job intended for user 241. Printer 232 can be automatically assigned to a print job intended for user 242. Printer 233 can be automatically assigned to a print job intended for user 243. Printer 235 can be automatically assigned to a print job intended for user 244.

The assignment of printers to print jobs can be dynamically changed as the locations of the users for whom the print jobs are intended change. For example, when user 244 moves from floor C to floor B, output intended for user 244 can be automatically printed by printer 233.

Factors other than user proximity can be used to assign print jobs to printers. For example, printer 234 can be assigned to a print job intended for user 244, when a load on printer 235 is heavier than a load on printer 234.

Further, a print job intended for multiple users can be automatically printed in multiple locations. For example, if a print job is intended for user 240 and user 243, the print job can be sent to both printer 230 and printer 233, each of which generates print output for a nearby user.

Figure 3:
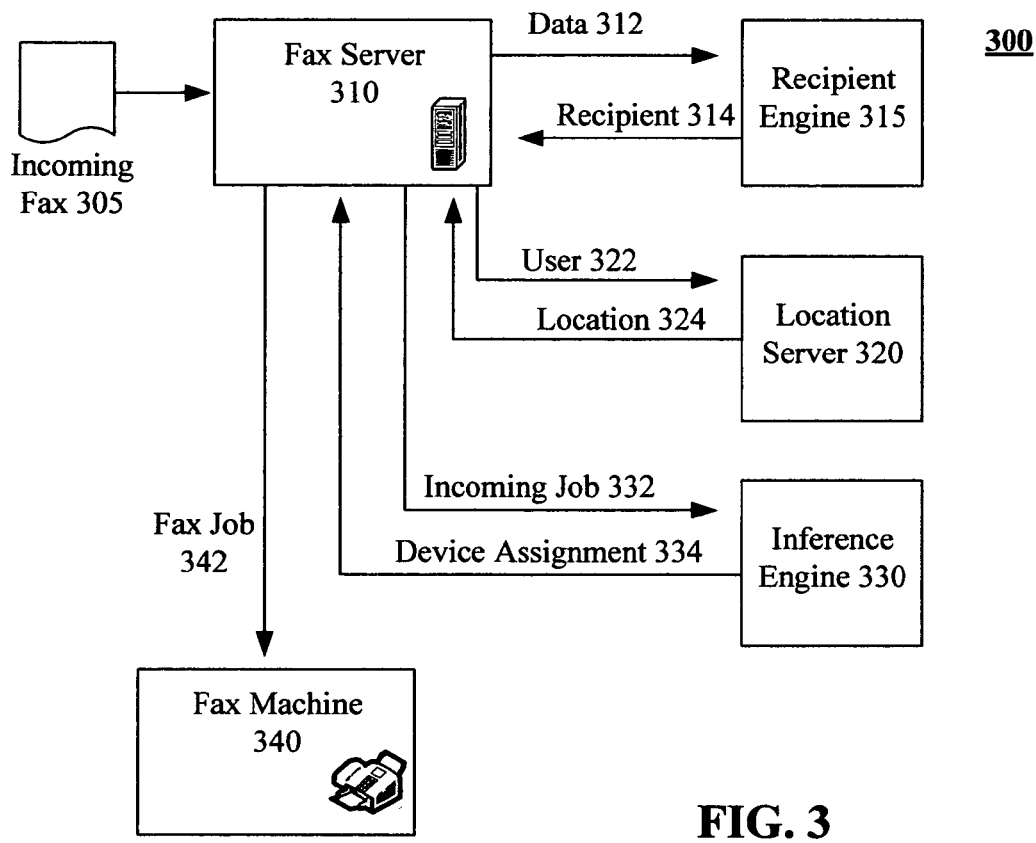
FIG. 3 is a schematic diagram of a system where an incoming fax can be automatically conveyed to a networked device proximate to a user in accordance with an aspect of an embodiment the inventive arrangements disclosed herein.

FIG. 3 is a schematic diagram of a system 300 where an incoming fax can be automatically conveyed to a networked device proximate to a user in accordance with an aspect of an embodiment the inventive arrangements disclosed herein. FIG. 3 can be one illustrative example of a system 100 where network jobs are assigned to networked devices where user proximity to a networked device is a factor for assigning network jobs. Although the device server shown in system 300 is a fax server, the invention is not to be limited in this regard. For example, contemplated derivatives of system 300 can include print servers for handling print jobs and multimedia servers for handling multimedia output.

System 300 can include a fax server 310 that accepts incoming fax messages 305. Fax server 310 can generate a new network job related to received fax message 305. The fax server 310 and fax machine 340 can include one or more data stores or memory spaces in which digital versions of fax messages' 305 can be electronically stored.

As shown in FIG. 3, fax server 310 can convey data 312 specific to the incoming fax message 305 to the recipient engine 315. The recipient engine 315 can process the data 312 and can automatically determine an intended message recipient. For example, the recipient engine can determine that an intended recipient for message 305 is "John Smith." A recipient identifier 314 specifying the determined recipient's identity can be conveyed from the recipient engine 315 to the fax server 310.

The fax server 310 can match the recipient identifier 314 against a list of user identifiers. The fax server 310 can search an Active Directory or other data store that contains network user information to determine user identifiers that match the recipient identifier 314.

For example, the recipient identifier 314 can identity "John Smith" working in technical support as an intended message 305 recipients. A network user having a user identifier of "JSmith01" can be matched to user name "John Smith."

The fax server 310 can convey the user identifier 322 to location server 320. The location server 320 can dynamically and automatically determine a current location 324 of JSmith01.

Additionally, incoming fax job data 332 can be conveyed to the inference engine 330. Incoming job data 332 can include any of a variety of data attributes, such as user identifier, user location, user preferences, job specific attributes, networked device attributes, and the like.

The inference engine 330 can utilize the incoming job 332 data to algorithmically determine an appropriate device to output the received message 305. The algorithm of the inference engine 330 that determines an appropriate device can be based upon one or more factors. One factor can include proximity of a user to the output device. Other factors can be based upon a best fit of output devices for an output job.

For example, an output device having a relatively light load can be preferred over a different output device having a relatively heavy load. Output devices generating particularly high quality output can be preferred to handle jobs representing finished products and can be disfavored to handle jobs representing draft products.

Different configurable weights can be established for the different factors. The weights and factors can be used to calculate a device suitability rating for a particular output device to handle the fax message 305. Suitability ratings can be calculated by the inference engine 330 for more than one output device. The device having the most favorable suitability rating can be assigned to handle the fax message 305.

Consequently, the inference engine 330 can provide device assignment data 334 that the fax server 310 utilizes to assign a device to output message 305. As shown in system 300, the assigned device for the message 305 can be fax machine 340.

It should be appreciated that the fax machine 340 that ultimately outputs the message 305 can be a device different from the machine that originally received the fax message 305. For example, fax machine 340 that ultimately output fax message 305 can be associated with a fax number 234-6789. A different fax machine (not shown) that initially receives message 305 can be associated with fax number 123-2345.

Additionally, networked devices other than fax machines can be used to output received fax messages. For example, a printer or copier can be used to print fax message 305. Further, output is not limited to paper formats. For example, contemplated output formats for message 305 can include an output file, a visual display, an audio presentation, and the like. One or more format conversion components or applications (not shown) can be used to generate different output formats.

Further, multiple different output formats can be automatically generated for a single message 305. For example, an email message including content of message 305 can be automatically generated and sent to each intended recipient of message 305. A paper copy of the message 305 can also be output to machine 340 and a visual copy of the message 305 can be visually presented within a popup window of a display of a client machine upon which an intended recipient is logged.

In one embodiment, a descriptive portion of the message 305 as opposed to a complete message 305 can be included in a converted output. For example, a voicemail account associated with an intended user can receive a small portion of the message 305, which has been converted into an audio format. A user accessing the voicemail account can hear the audio portion, which can indicate a relative importance of the message to the recipient so that suitable actions can be taken.

Figure 4:
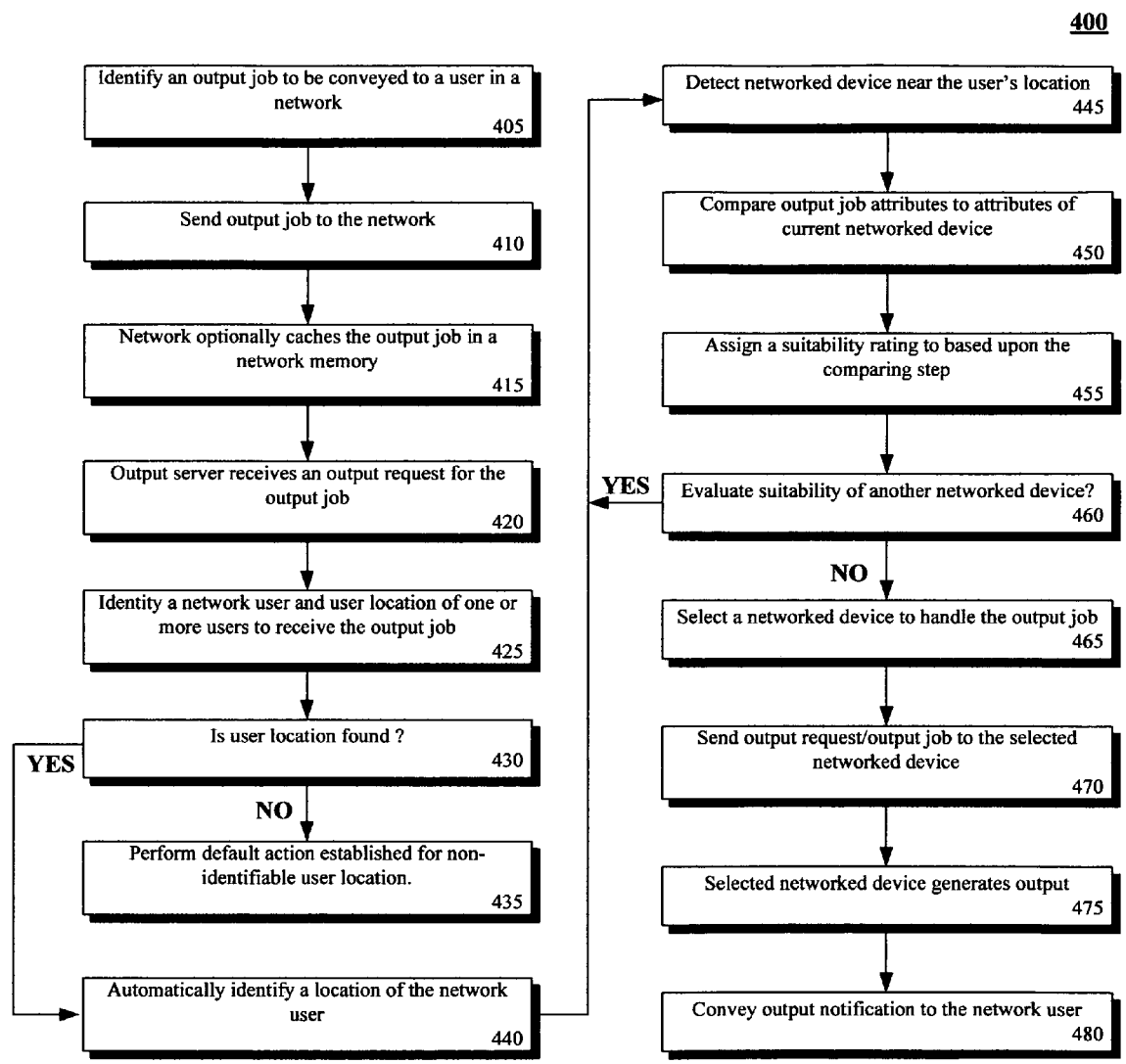
FIG. 4 is a flow chart of a method for utilizing networked devices based upon user locations in accordance with an embodiment of the inventive arrangements disclosed herein.

FIG. 4 is a flow chart of a method 400 for utilizing networked devices based upon user locations in accordance with an embodiment of the inventive arrangements disclosed herein. Method 400 can be performed in the context of a system 100, 200, and/or 300.

Method 400 can begin in step 405, where a network job can be identified. The network job can be intended for one or more users. In one embodiment, the intended users can be explicitly designated by a user that initiates the network job at the time that the network job is initiated.

In another embodiment, the intended users can be determined from the content of the network job. For example, if an incoming job includes an incoming fax, a fax header page can designate a name of an intended recipient, which can be determined using optical character recognition (OCR) technology.

In step 410, the network job can be sent to a device server. For example, the network job can be sent to a print server, a fax server, an email server, or another device server in the network.

In step 415, the network can optionally cache the network job in a network memory. The cache can be used to convert a digital version of the job from one format to another. The cache can also be used to delay delivery of a message to a designated time.

For example, a print job initiated at 7:00 p.m. can indicate that output is to be generated at 10:00 a.m. the next day by a printer close to an intended recipient. The location of the recipient can be automatically determined at or about 10:00 a.m. Accordingly, the print job can be automatically produced by the printer proximate to the intended recipient, even though the user initiating the print job at 7:00 p.m. may not have known where the intended recipient will be located at 10:00 a.m.

In step 420, the appropriate output server can receive an output request for the network job. In step 425, one or more network users that are to receive the network job can be identified. In step 430, a determination can be made as to whether a location for each intended user can be determined.

If not, the method can progress to step 435, where a default action can be performed. Different default actions can be established by a user or authorized administrator. A variety of configurable factors can determine which of many potential default actions is performed in step 435.

For example, a network job can be delayed until a location for an intended user can be determined. A network job can be automatically deleted from the delay queue after an administrator determined time. A network job can also be directed towards a default output device. Additionally, the network job can be selectively converted from a preferred output format into a secondary output format, such as an email format.

If locations for the intended users are identified in step 430, the method can progress from step 430 to step 440. In step 440, a location for an intended recipient can be determined. In step 445, a networked device near the recipient's location can be detected. In step 450, network job attributes can be compared to attributes of the detected networked device. In step 455, a suitability rating can be computed based upon the comparing step. In step 460, a determination can be made as to whether or not additional networked devices should be detected. If yes, the method can loop to step 445 and a suitability rating can be determined for another networked device.

If no additional networked devices are to be detected, the method can progress from step 460 to step 465, where a networked device can be selected to handle the network job. When multiple peripherals have been queried, the assignment can be based upon most favorable suitability rating. In step 470, an output request and/or network job can be sent to the selected networked device. In step 475, the selected networked device can generate output. In step 480, an output notification can be conveyed for the network user to which the output is intended. The output notification can specify the location of the device that generated the output.

Figure 5:
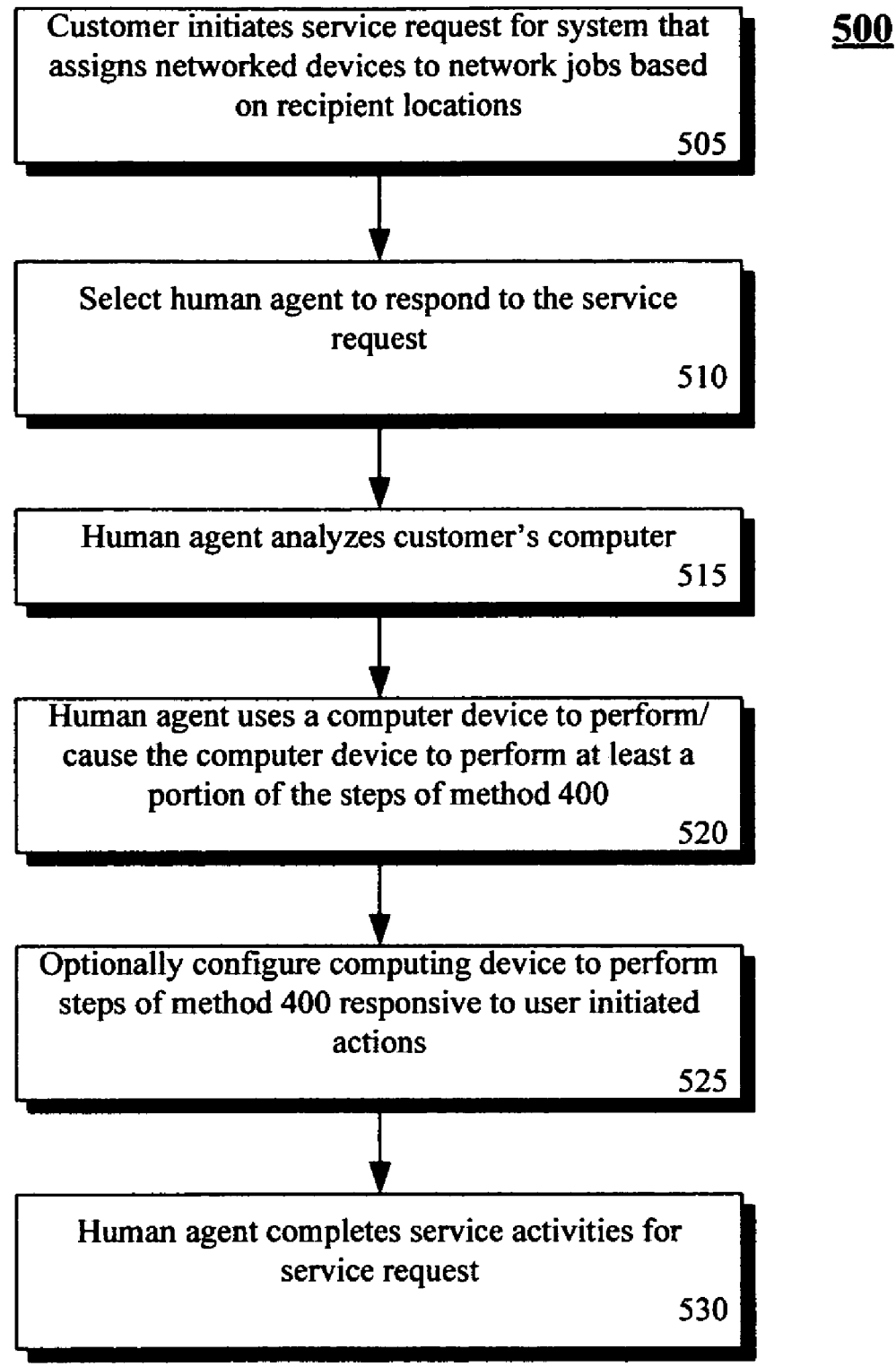
FIG. 5 is a flow chart of a method, where a service agent can configure a system that utilizes location based networked devices in accordance with an embodiment of the inventive arrangements disclosed herein.

FIG. 5 is a flow chart of a method 500, where a service agent can configure a system that utilizes location based networked devices in accordance with an embodiment of the inventive arrangements disclosed herein. Method 500 can be preformed in the context of system 100, 200, and/or 300.

Method 500 can begin in step 505, when a customer initiates a service request. The service request can be a request for a service agent to convert a legacy system for assigning jobs to peripherals into a location based system. The service request can also be a request to troubleshoot a problem with a location based system. Additionally, the request can be for an enhancement of an existing location based system, such as a request to enhance an existing system to include more accurate user location detection components.

In step 510, a human agent can be selected to respond to the service request. In step 515, the human agent can analyze a customer's current system and can develop a solution. The solution can include the acquisition and deployment of additional hardware, such as location beacons and location sensors.

In step 520, the human agent can use one or more computing devices to perform or to cause the computer device to perform the steps of method 400. In optional step 525, the human agent can configure the customer's computer in a manner that the customer or clients of the customer can perform one or more steps of method 400 in the future. For example, the service agent can load and configure administration software so that the customer can adjust peripheral behavior and selection criteria using the administration software. In step 530, the human agent can complete the service activities.

It should be noted that while the human agent may physically travel to a location local to adjust the customer's computer or application server, physical travel may be unnecessary. For example, the human agent can use a remote agent to remotely manipulate the customer's computer system and/or an application server.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for utilizing networked devices in a network, comprising the steps of: receiving a networked job associated with a network user at a device server coupled to the network, the network user being a human; automatically determining a current physical location of the network user, performed by a location server coupled to the network and performed in response to the device server receiving the network job; dynamically selecting one of a plurality of networked devices coupled to the network based upon the determined current physical location of the network user, wherein the selecting is performed by the device server in response to receiving the network job; and assigning the network job to the selected device, performed by the device server wherein the selected device generates an output for the network job; further comprising the steps of: determining at least one job specific attribute associated with the network job; determining at least one device specific attribute; comparing the at least one specific attribute and the at least one device specific attribute, wherein the networked device chosen in the selecting step is based at least in part upon results of the comparing step, and wherein the device specific attributes comprises load, output quality, and output security.

2. The method of claim 1, wherein the determining comprises the steps of: detecting a location beacon carried by the network user; and determining the current physical location of the network user based upon detecting the location beacon.

3. The method of claim 2, wherein the location beacon comprises a Radio Frequency Identification (RFID) tag that is read by at least one Radio Frequency Identification tag scanner functioning, each Radio Frequency Identification tag scanner functioning as a location sensor.

4. The method of claim 2, further comprising the steps of: attaching a location beacon to each of the plurality of networked devices; and automatically determining a location of the networked devices using the attached location beacons.

5. The method of claim 1, wherein the network job specifies an output time when output is to be generated for the network job, wherein the identifying step dynamically determines the location of the network user at approximately the output time.

6. The method of claim 1, said method further comprising the step of: conveying an output notification to the network user that indicates the selected networked device where results from the network job are able to be retrieved.

7. The method of claim 1, wherein the network user is an intended recipient for the network job, said method further comprising the step of: receiving a network request that results in the network job from a different user than the network user, wherein at least one of the different user and the network request explicitly identifies the network user as the intended recipient.

8. The method of claim 1, said method further comprising the steps of: automatically analyzing content of the network job to determine an identity of an intended recipient the intended recipient being a human; and automatically ascertaining one of a plurality of network users that corresponds to the determined identity.

9. The method of claim 8, wherein the network job outputs a facsimile message, wherein the intended recipient is determined from a header page of the facsimile message.

10. The method of claim 1, wherein the network request is a request to output a received facsimile message conveyed to a facsimile receiving device associated with a phone number, wherein the plurality of networked devices comprise a plurality of printers to which messages sent to the facsimile receiving device are able to be automatically routed.

11. The method of claim 10, wherein the selected networked device upon which the facsimile message is printed is a printer that is most proximate to the determined location of the network user.

12. The method of claim 1, wherein said steps of claim 1 are performed by at least one machine in accordance with at least one computer program having a plurality of code sections that are executable by the at least one machine the networked job does not designate an output device.

13. The method of claim 1, wherein the steps of claim 1 are performed by at least one of a service agent and a computing device manipulated by the service agent, the steps being performed in response to a service request.

14. A method for automatically selecting among network printers coupled to a network based upon user location comprising the steps of: a print server coupled to the network receiving a print job; the print server determining an intended recipient for the print job in response to receiving the print job, the intended recipient being a human; a location server coupled to the network dynamically determining a current physical location of the intended recipient, performed in response to receiving the print job at the print server; automatically determining at the print server a network printer coupled to the network that is physically closest to the determined current physical location of the intended recipient upon determining the current physical location of the intended recipient; and automatically assigning the print job to the determined network printer which outputs the print job, further comprising the steps of: determining at least one job specific attribute associated with the network job; determining at least one device specific attribute; comparing the at least one specific attribute and the at least one device specific attribute, wherein the networked device chosen in the selecting step is based at least in part upon results of the comparing step, and wherein the device specific attributes comprises load, output quality, and output security.

15. The method of claim 14, further comprising the step of: automatically notifying the intended recipient that printed output for the intended recipient has been generated by the determined network printer.

16. A system that generates a network output based upon an automatically determined user location comprising: a plurality of client machines configured to provide network access to a plurality of network users, the network users being humans; a plurality of networked devices, each configured to handle assigned network jobs; a location server configured to dynamically determine current physical locations of the network users; and a device server configured to receive the network jobs, to identity at least one identify a network user for whom each of the network jobs network job is intended in response to receipt of each network job at the device server, to assign the network jobs each network job to at least one of the plurality of networked devices based upon at least one factor, wherein one of the at least one factor is proximity of a networked device the at least one of the plurality of the networked devices to a current physical location of the network user for whom output from network job is intended, wherein the current physical location of the network user for whom the network lob is intended is automatically determined by the location server in response to the device server receiving the network job, further comprising the steps of: determining at least one job specific attribute associated with the network job; determining at least one device specific attribute; comparing the at least one specific attribute and the at least one device specific attribute, wherein the networked device chosen in the selecting step is based at least in part upon results of the comparing step, and wherein the device specific attributes comprises load, output quality, and output security.

17. The system of claim 16, further comprising: a plurality of location beacons, each location beacon being a mobile beacon intended to be carried by the network users; and a plurality of location sensors configured to automatically detect the location beacons, wherein the location server utilizes the location beacons and the location sensors to determine physical locations of network users.

18. The system of claim 16, wherein the at least one automatically determined factor includes a plurality of factors, wherein the plurality of factors are used to calculate a device suitability rating, wherein the device server assigns network jobs to networked devices based upon device suitability ratings, wherein the plurality of factors compares network job specific attributes with networked device specific attributes.

* * * * *